Aug. 5, 1930.　　　F. E. ANDERSON　　　1,772,174

ROD COUPLING

Filed Nov. 25, 1925

Witness
Edwin Trueb

Inventor:
FRANK E. ANDERSON,
by: R. D. Little
his Attorney.

Patented Aug. 5, 1930

1,772,174

UNITED STATES PATENT OFFICE

FRANK E. ANDERSON, OF COLUMBUS, OHIO, ASSIGNOR TO THE COLUMBUS SUCKER ROD COMPANY, OF COLUMBUS, OHIO, A CORPORATION OF OHIO

ROD COUPLING

Application filed November 25, 1925. Serial No. 71,339.

My invention relates to rod couplings of the class used to detachably fasten the abutting ends of a series of metal rods in assembling the rods into a "string", as for example, in forming sectional sucker rods for use in pumping deep wells, such as oil wells.

The depth of such wells is constantly increasing, which necessitates longer strings of the sucker rod sections. The small cross-section of the casing used in such wells limits the transverse dimensions of the rods and couplings and, on account of the increased length of the "strings," because of the great depth to which wells, particularly oil wells, are now drilled, metal rods have, to an increasingly large extent, replaced the long used strings formed of metal tipped wooden sucker rods.

The weight of the rods forming a modern "string" has reached the point that the ordinary couplings used in assembling the rod sections into a string frequently fail.

Having a coupling fail in a string of 1500 to 3000 feet or more in length while it is suspended within a well generally results in long delays in the pumping operations and great expense in removing the lower portion of the broken sucker rods.

One object of my invention is to provide a rod or coupling of improved construction and having novel means whereby the rods of a series are detachably connected, end to end, into a "string" in a strong and efficient manner.

The invention consists primarily in a rod coupling of few parts and having novel means whereby the coupling is held against longitudinal movement on one of the two rods with which it is used in an assembled string of the rods.

Referring now to the drawings forming part of this specification, Figure 1 is a sectional plan showing the abutting ends of two rods as connected by couplings made in accordance with my invention.

Figure 1:
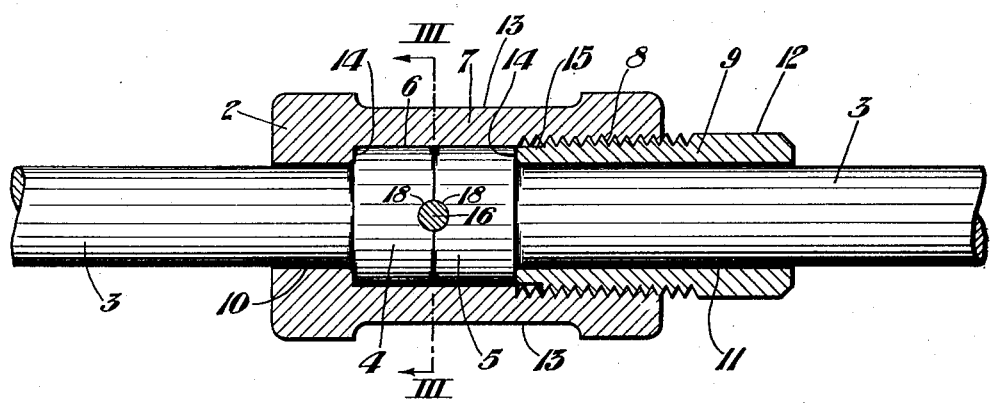

In the accompanying drawings, the coupling, which is designated as a whole by the numeral 2, is shown as assembled in connecting endwise the abutting ends of two comparatively long metal rods 3. Each of the rods 3, which are round in cross-section, has cylindrical enlargements 4 and 5 formed on its ends. The enlarged abutting ends of each rod 3, which are integrally formed on the rods by upsetting or other known manner, are seated within the longitudinal opening 6 in the sleeve 7 of the coupling 2. The opening 6 has internal threads 8 by which the externally threaded gland 9 is secured to the sleeve in fastening two of the rod sections 3, 3 in endwise alinement. The other or unthreaded end of the sleeve 6 has a smaller opening 10, of a size to make a sliding fit on the rod 3, which is of circular cross-section and which extends through the opening or hole 10. A similar axial opening 11 is provided in the gland 9 through which the other rod 3 extends. The outer or unthreaded end 12 of the gland 9 is of polygonal cross-section, generally hexagonal, to enable the gland to be readily screwed into and out of the coupling sleeve 6 by means of a wrench. The sleeve 7 when made round in cross-section, is provided with flattened spots 13, 13 on diametrally opposite points to enable a wrench to be applied so as to prevent turning axially when inserting or removing the gland 9.

As the enlarged ends 4 and 5 are integrally formed on the rods 3, a coupling sleeve 7 and a gland 9 must be put on each rod 3 before the second of the two enlarged ends 4 and 5 is formed and afterward can not be removed. The weight of the series of rods forming the sucker rod as now used, in many cases is so great that in time the enlargements 4 and 5 tend to upset and thereby enlarge. This upsetting ordinarily occurs on the end 14 of the enlargements. On that account the enlargements 4 and 5 preferably are made of a diameter to neatly fit within the unthreaded portion of the opening 6 in the sleeve 7, and the threaded end of the gland 9 has an unthreaded cylindrical portion 15 of a diameter to neatly fit and extend into the unthreaded part of the opening. In this way the internal threads in the sleeve 7 do not contact with the adjacent cylindrical enlargement 5 on the end of the rods 3 and any tendency of the enlargements to upset is opposed by the smooth surface of the contacting wall of the opening 6.

When connecting the couplings in assembling a string of sucker rods, the assembled portion of the string hangs suspended in the well and when the sleeve 7 and gland 9 are both loose upon the rods one of these members frequently slips and slides downwardly on the uppermost sucker rod within the well.

When this occurs it becomes necessary to lift the last or upper section of the partly assembled string of rods in order to reach the sleeve or gland which has slid to the lower end of the rod.

Figure 2:
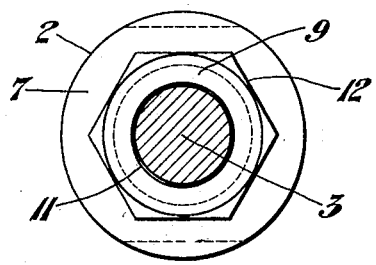
Figure 2 is an end elevation of Figure 1.
Figure 3:
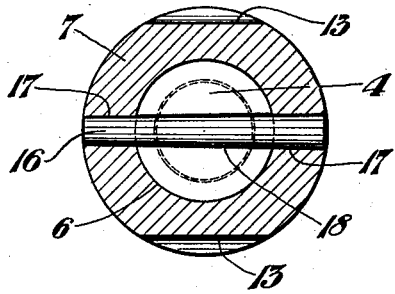
Figure 3 is a transverse section taken on the line III—III of Figure 1.

In order to prevent such occurrences and the consequent delays, provision is made on my improved coupling for detachably securing to one end of each rod 3 the sleeve 7. In such case the sleeve end of each rod will be its upper end in assembling the string. The means preferably employed in fastening the sleeve to the rod comprises a pin 16 which is inserted in a transverse hole 17 extending through the wall of the sleeve 7. This hole is advantageously located so that semi-circular grooves 18 in the abutting faces of the enlarged ends 4 and 5 of the rods 3 encircle the pin 16 as shown in Figures 1, 2, and 3. The pin 16 preferably will be tapered and of a length equal to the outer diameter of the sleeve 7. (See Figure 3). By thus terminating the pin 16 within the sleeve 7 there are no projecting ends to catch on the well casing, and, further, the pin is less liable to become accidentally loosened by striking the well casing or other objects.

Figure 4:
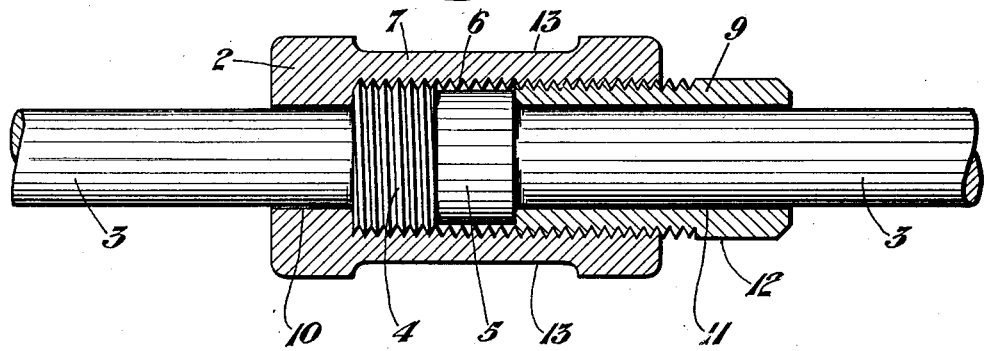
Figure 4 is a sectional plan similar to Figure 1, showing a modified form of coupling embodying my invention.

Another way of fastening the sleeve to one end of the rods 3, as is shown in Figure 4, is to thread the enlargement 4 on each rod 3 and provide internal threads over the entire length of the recess 6 in the sleeve 7. In this construction the threads need not be turned off the inner end of the gland 9.

In the construction of Figure 4, the rods 3, sleeve 2, and gland 9 otherwise are the same as in Figures 1, 2, and 3.

The advantages of my invention will be apparent to those skilled in the art.

Many modifications may be made in the construction of the couplings without departing from my invention as defined in the appended claims. The rods may be tubular instead of solid bars. The coupling sleeve may be hexagonal in cross-section instead of cylindrical, and other changes may be made.

I claim:—

1. In a rod coupling, the combination with a pair of solid rods having alined, abutting ends, said abutting ends being upset to form integral enlarged heads, said heads having straight side faces and straight parallel end faces, of a coupling comprising a hollow counterbored and internally threaded one-piece sleeve in which the enlarged abutting heads on said rods are seated, the bore of said sleeve being substantially equal to the diameter of said heads so as to form a snug fit with said heads, a gland screwed into said sleeve and having its inner end in engagement with the head on one of said rods to secure the heads on said rods in endwise engagement with each other, and means within the outline of said sleeve for preventing lengthwise movement of said sleeve on the rod on which it is mounted.

2. In a rod coupling, the combination with a pair of solid rods having alined, abutting ends, said abutting ends being upset to form integral enlarged heads, said heads having straight side faces and straight parallel end faces, of a coupling comprising a hollow counterbored and internally threaded one-piece sleeve in which the enlarged abutting heads on said rods are seated, the bore of said sleeve being substantially equal to the diameter of said rods and the counterbore of said sleeve being substantially equal to the diameter of said heads so as to form a snug fit with said heads, a gland screwed into said sleeve and having its inner end in engagement with the head on one of said rods to secure the heads on said rods in endwise engagement with each other, said gland being provided with a cylindrical unthreaded portion projecting inwardly beyond the internal threads in said sleeve so as to permit the enlarged heads to be located wholly in the unthreaded portion of said sleeve, said sleeve being provided with alined holes and said enlarged heads having their abutting end faces provided with semi-circular grooves, and a pin mounted in said holes and said grooves and terminating within the outline of said sleeve, said pin being adapted to prevent said sleeve moving longitudinally on the rod on which it is mounted, and to prevent turning on said rods.

In testimony whereof, I have hereunto signed my name.

FRANK E. ANDERSON.